United States Patent [19]
Hutton

[11] Patent Number: 6,079,443
[45] Date of Patent: Jun. 27, 2000

[54] INSTRUMENT VALVE MANIFOLDS FOR USE WITH PRESSURE TRANSMITTERS

[76] Inventor: Peter B. Hutton, 2406 26 A Street S.W., Calgary, Alberta, Canada, T32C1

[21] Appl. No.: 09/174,765

[22] Filed: Oct. 19, 1998

[51] Int. Cl.[7] ...................................................... F16K 11/20
[52] U.S. Cl. .............................................................. 137/597
[58] Field of Search ..................................... 137/597, 606, 137/607

[56] References Cited

U.S. PATENT DOCUMENTS

| | | |
|---|---|---|
| D. 287,827 | 1/1987 | Broden . |
| D. 297,315 | 8/1988 | Pierce et al. . |
| D. 317,266 | 6/1991 | Broden et al. . |
| D. 318,432 | 7/1991 | Broden et al. . |
| 3,564,923 | 2/1971 | Nudd, Jr. et al. . |
| 3,596,680 | 8/1971 | Adams . |
| 3,618,390 | 11/1971 | Frick . |
| 3,653,405 | 4/1972 | Nelson . |
| 3,747,637 | 7/1973 | Mollere . |
| 3,765,441 | 10/1973 | Chang . |
| 3,768,511 | 10/1973 | Bias . |
| 3,817,283 | 6/1974 | Hewson . |
| 3,934,605 | 1/1976 | Legris . |
| 4,182,362 | 1/1980 | Hewson et al. . |
| 4,193,420 | 3/1980 | Hewson . |
| 4,215,721 | 8/1980 | Hetherington et al. . |
| 4,231,261 | 11/1980 | Elmer . |
| 4,281,683 | 8/1981 | Hetherington et al. . |
| 4,319,492 | 3/1982 | Hewson et al. . |
| 4,466,290 | 8/1984 | Frick . |
| 4,494,568 | 1/1985 | Young . |
| 4,602,657 | 7/1986 | Anderson, Jr. et al. . |
| 4,672,728 | 6/1987 | Nimberger . |
| 4,726,399 | 2/1988 | Miller . |
| 4,738,276 | 4/1988 | Adams . |
| 4,745,810 | 5/1988 | Pierce et al. . |
| 4,798,089 | 1/1989 | Frick et al. . |
| 4,833,922 | 5/1989 | Frick et al. . |
| 4,865,360 | 9/1989 | Adams . |
| 4,879,912 | 11/1989 | Suckow . |
| 4,921,072 | 5/1990 | Divisi . |
| 4,977,917 | 12/1990 | Adams . |
| 4,993,754 | 2/1991 | Templin, Jr. . |
| 5,036,884 | 8/1991 | Miller et al. . |
| 5,048,569 | 9/1991 | Stoll et al. . |
| 5,117,867 | 6/1992 | Adams . |
| 5,209,258 | 5/1993 | Sharp et al. . |

(List continued on next page.)

FOREIGN PATENT DOCUMENTS

| | | |
|---|---|---|
| 1008701 | 4/1977 | Canada . |
| 2086535 | 5/1982 | United Kingdom . |
| 2271164 | 4/1994 | United Kingdom . |
| WO 93/05329 | 3/1993 | WIPO . |
| WO 96/18091 | 6/1996 | WIPO . |

OTHER PUBLICATIONS

Brochure: Manifolds. Century Valve Ltd., Calgary, Alberta, Canada. Admitted prior art.

Flier: DA Minimatic Three Valve Manifold. DA Mfg. Co., Tulia, Texas. Jun. 20, 1978.

Brochure: Instrumentation Manifolds: The Word Standard. Bulletin 4190. Parker Fluid Connections. Dec. 1992.

Flier: "Safti–fold" 3 Valve Unimount. Admitted prior art.

*Primary Examiner*—Stephen M. Hepperle
*Attorney, Agent, or Firm*—Browning Bushman

[57] ABSTRACT

An instrument valve manifold 10, 210 interfaces between a flowline control manifold CM and one or more pressure transmitter units T1, T2. The instrument valve manifold includes a monolithic body 32,232 that defines a mating surface 34,234 having a low pressure port 52, 252 and a high pressure port 54, 254, a low pressure plenum 58, 258 and a high pressure plenum 60,260, and at least one equalizing valve pocket 96, 296 for receiving an equalizing valve 100, 300. Fluid passageways in the body 32, 232 extend from the low pressure input port to the low pressure plenum and from the high pressure input port to the high pressure plenum. The instrument valve manifold reduces the size and weight of components connected to the control manifold, reduces the moment arm of the combined weight of the instrument valve manifold and the transmitter on the control manifold, and distributes the weight substantially equally about the plane of symmetry 30 of the control manifold.

20 Claims, 7 Drawing Sheets

U.S. PATENT DOCUMENTS

| | | |
|---|---|---|
| 5,248,167 | 9/1993 | Petrich et al. . |
| 5,272,646 | 12/1993 | Farmer . |
| 5,277,224 | 1/1994 | Hutton et al. . |
| 5,303,733 | 4/1994 | Nelson . |
| 5,341,846 | 8/1994 | Framberg . |
| 5,449,294 | 9/1995 | Rench et al. . |
| 5,494,071 | 2/1996 | Bell et al. . |
| 5,586,570 | 12/1996 | Fukano et al. . |
| 5,720,317 | 2/1998 | Nimberger ............................ 137/597 |

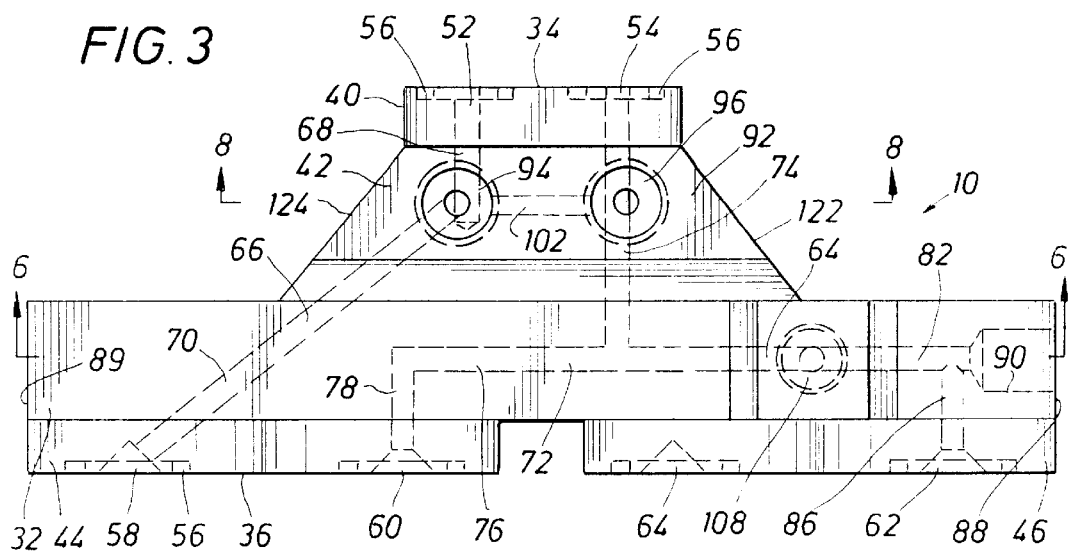
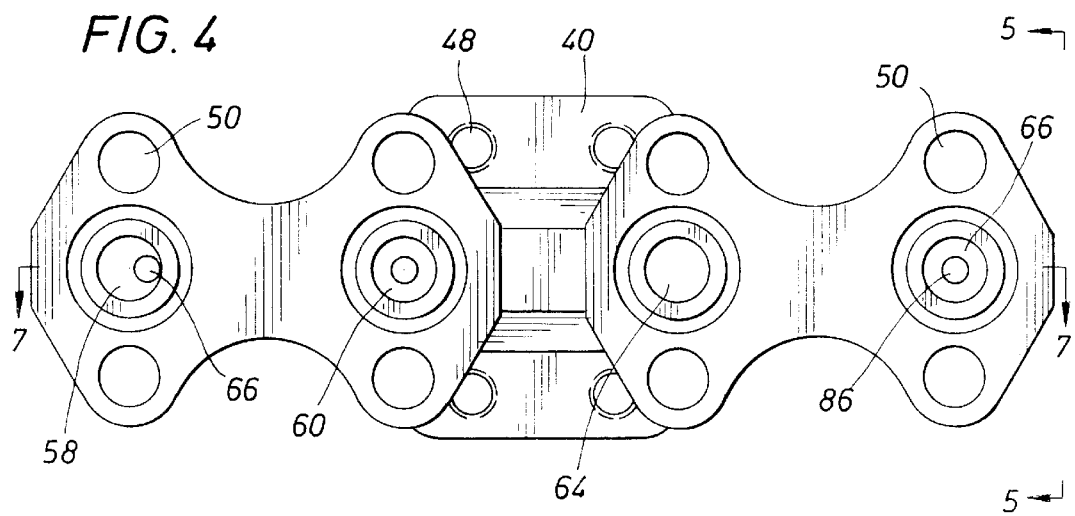
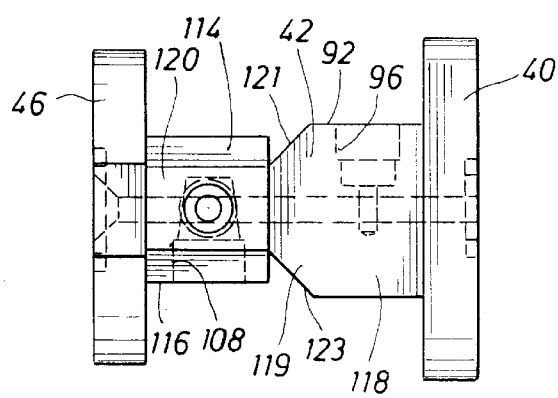

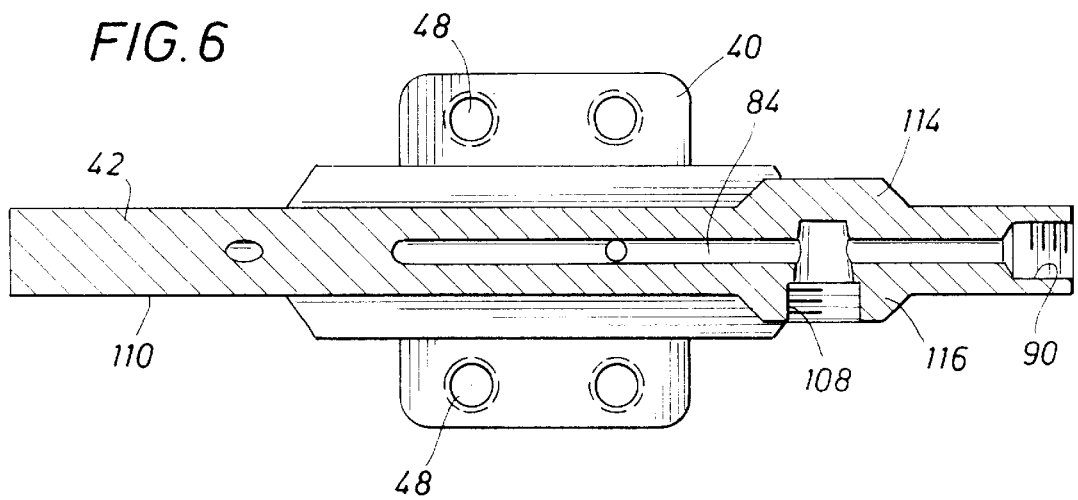
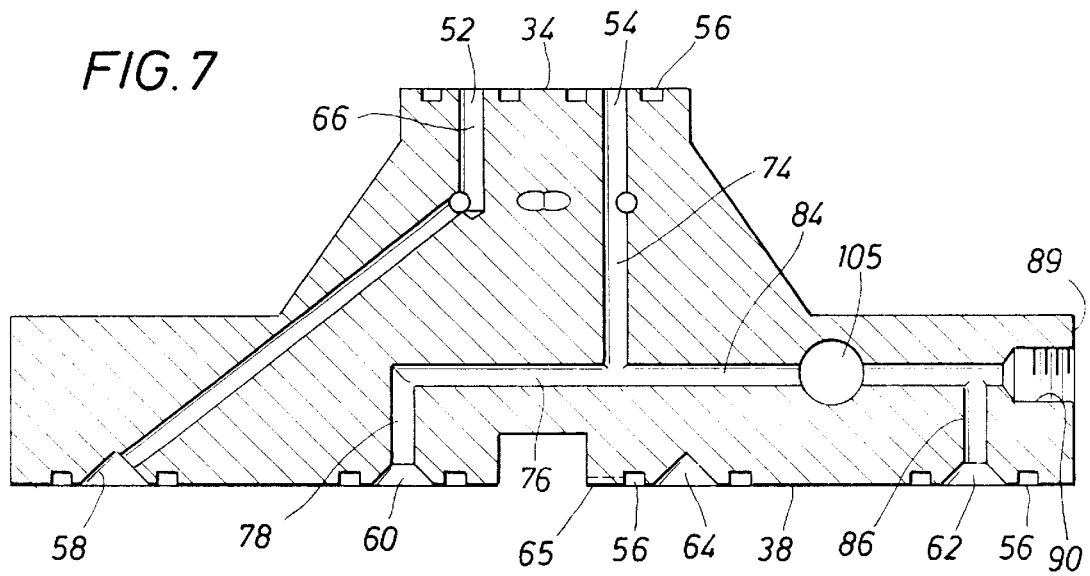
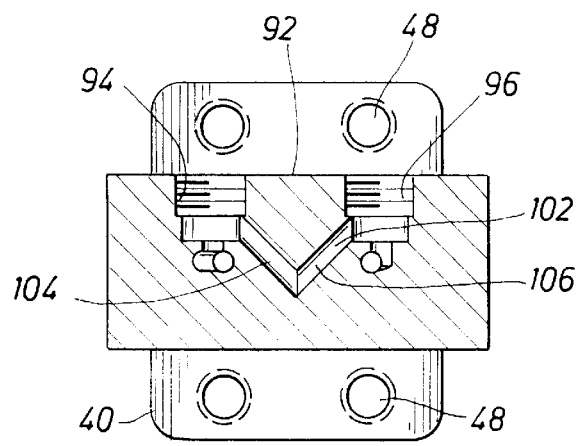

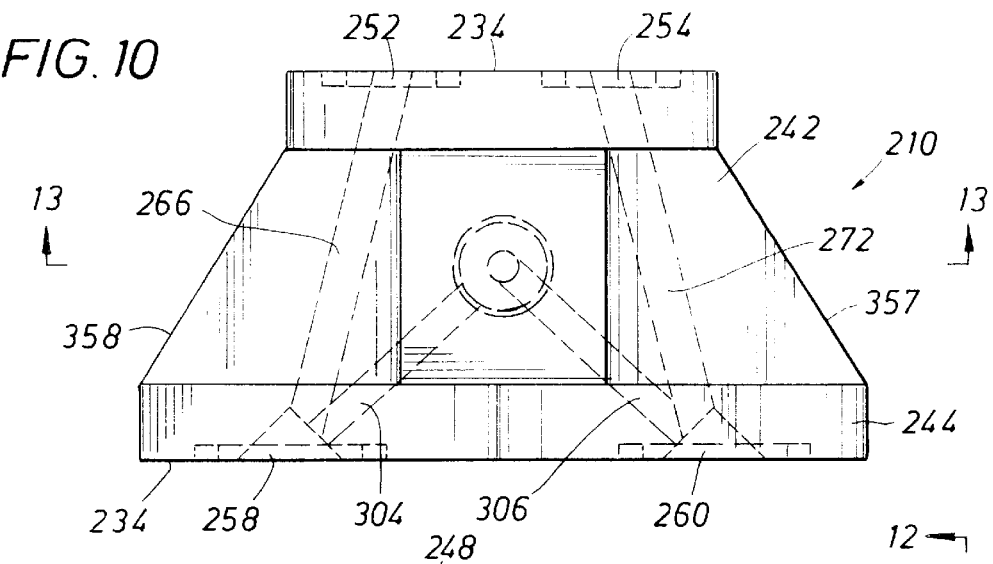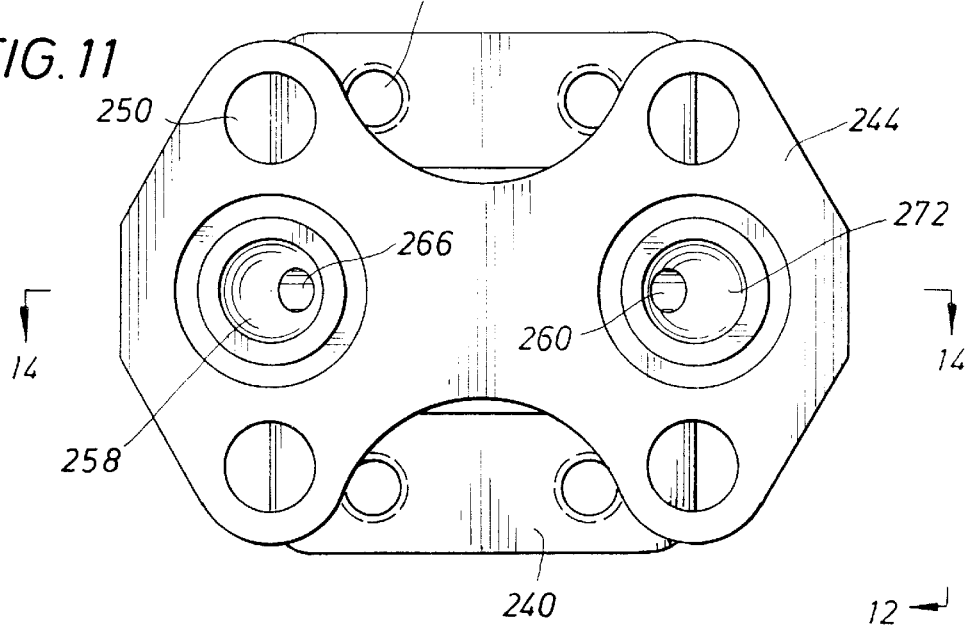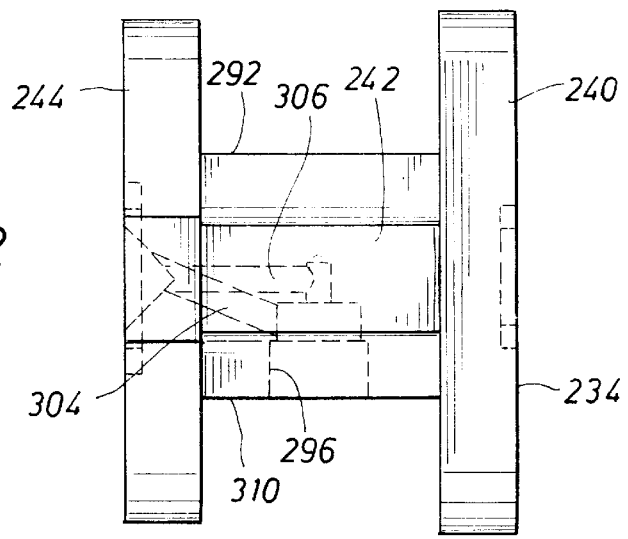

INSTRUMENT VALVE MANIFOLDS FOR USE WITH PRESSURE TRANSMITTERS

BACKGROUND OF THE INVENTION

1. Field of the Invention

The present invention relates to a valve manifold for controlling fluid flow between a main flowline and a plurality of pressure sensors/transmitters.

2. Description of the Prior Art

It is frequently necessary to obtain pressure and/or flow characteristics of a fluid in a pipeline or flowline. One common way to accomplish this is by disposing in the flowline a restriction such as an orifice plate, a flow nozzle, or a venturi tube. The high and low pressure values taken from opposed sides of the flow restriction in the flowline are detected by a pressure sensor/transmitter assembly that measures and/or transmits the measured pressures or pressure differential by a suitable mechanical or electrical signal to a remote location, e.g., a control room.

Typically, a valve manifold is mounted between the flowline and the pressure sensor/transmitter, the manifold, in addition to controlling flow to the pressure sensor/transmitter, permitting various functions such as blocking, venting, zero checking, and calibration. A typical manifold includes a plurality of valves, each movable between open and closed positions relative to a flow pathway in the manifold so as to control the flow of fluid through the pathway.

There is an ever increasing desire by the manufacturers of pressure sensors/transmitters to reduce the size, not only of the pressure sensor/transmitter, but also of the package comprised of the manifold that attaches to the flowline and the attached pressure sensor/transmitter. Large, heavy manifold/pressure transmitter packages are more expensive to make, difficult to handle and install, and in many cases simply will not fit appropriately in their intended environment, meaning they have to be installed at another location or in undesirable orientations.

In co-pending U.S. application Ser. No. 08/941,951, filed Oct. 1, 1997, and entitled *Two-Piece Manifold*, there is disclosed a two-piece modular manifold comprised basically of what may be characterized as a process module and an instrument module, the process module being connected to the flowline, the instrument module mating with the pressure sensor/transmitter. The modular manifold disclosed in the latter mentioned patent application is extremely compact and is especially useful for a single, coplanar pressure sensor/transmitter and, more specifically, a differential pressure sensor/transmitter.

It is frequently desired not only to have a differential pressure measurement across the flow restrict or in the pipeline, but also to be able to determine absolute line pressure. For the latter purpose, a gauge pressure transmitter is installed on the pipeline, the gauge pressure transmitter measuring the pressure upstream of the flow restrictor in the flowline. In the distant past, this generally required a separate installation for the differential pressure transmitter and the gauge pressure transmitter. This was clearly undesirable as it increased the likelihood of leakage since it required two separate taps in the flowline installations. Moreover, the requirement of two installations mandated the use of a larger amount of space, often times in environments where space was at a premium. To overcome the problem of two separate installations, various solutions have been proposed. For example, in U.S. Pat. No. 5,036,884, the problem of overcoming dual installations was addressed by means of a valve manifold and an interfacing or transmitting mounting plate providing communication between the valve manifold and the two different transmitters. However, this solution required that the two main block valves that control flow from the high and low pressure outlets from the main flowline, plus any equalizing or venting valves, be carried by the manifold. Furthermore, the assembly shown in U.S. Pat. No. 5,036,884 is bulky and subject to undesirable torsional and bending loads, particularly in flow lines subject to vibrations and/or pulsations from compressors, pumps, and the like in the flowline. To overcome these torsional and bending loads, it is desirable to reduce, to the extent possible, the distance between the orifice taps in the flowline and the laterally outwardmost extremes of the manifold/pressure sensor/unit package.

SUMMARY OF THE INVENTION

It is therefore an object of the present invention to provide an improved manifold for supplying fluid pressure signals to a single or multiple pressure transmitter or sensor that form a compact manifold/pressure sensor unit package.

Another object of the present invention is to provide an instrument valve manifold having a monolithic body that can be spaced between a flowline control valve manifold and a single or dual pressure sensor unit, with the instrument valve manifold including one or more valves for regulating flow to the single or dual pressure sensor unit.

The above and other objects of the present invention will become apparent from the drawings, the description given herein, and the appended claims.

In the embodiment intended for supplying pressure signals to dual pressure sensor units, the instrument valve manifold of the present invention provides an interface between a flowline control manifold and first and second pressure sensor units. The flowline control manifold includes a high pressure passageway and a low pressure passageway selectively controlled by respective high pressure and low pressure control valves. The instrument valve manifold of the present invention has a monolithic body that defines a mating surface for mating with the control manifold and an instrument face for mating with the first and second pressure sensor units. A first high pressure plenum and a low pressure plenum are formed in the instrument face for cooperation with the first pressure sensor unit. A second high pressure plenum is formed in the instrument face for cooperation with the second pressure sensor unit.

The body also includes an equalizing valve pocket surface spaced between the mating face and the instrument face. Formed in the equalizing valve pocket surface is a low pressure equalizing valve pocket and a high pressure equalizing valve pocket. An equalizing fluid passageway interconnects the high pressure equalizing valve pocket and the low pressure equalizing valve pocket, and an equalizing valve disposed in at least one of the high and low pressure equalizing valve pockets selectively controls flow through the equalizing fluid passageway. A gauge pressure passageway is connected to the high pressure fluid passageway and is in fluid communication with the second high pressure plenum. A block valve pocket intersects the gauge pressure passageway and carries a block valve to selectively control flow through the gauge pressure passageway.

In the embodiment intended for supplying pressure signals to a single pressure sensor unit, the instrument valve manifold of the present invention similarly provides an interface between a flowline control manifold and the pressure sensor unit. The instrument valve manifold has a monolithic body that defines a mating surface for mating with the control manifold and an instrument face for mating with the pressure sensor unit. A high pressure plenum and a low pressure plenum are formed in the instrument face for interconnecting the high pressure input port with the high pressure plenum and a low pressure input port with a low pressure plenum, respectively. An equalizing valve pocket is formed in an intermediate portion of the body. An equalizing fluid passageway interconnects the high pressure plenum and the low pressure plenum, and an equalizing valve disposed in the equalizing pocket selectively controls flow through the equalizing fluid passageway.

BRIEF DESCRIPTION OF THE DRAWINGS

FIG. 3 is a top view of the instrument valve manifold shown in FIG. 2.

FIG. 4 is a back view of the instrument valve manifold shown in FIG. 2 from the instrument face end of the manifold.

FIG. 5 is a left side view of the instrument valve manifold shown in FIG. 2.

FIG. 6 is a cross-sectional view taken along the lines 6—6 in FIG. 3.

FIG. 7 is a cross-sectional view taken along the lines 7—7 in FIG. 4.

FIG. 8 is a cross-sectional view taken along the lines 8—8 in FIG. 3.

FIG. 10 is a top view of the instrument valve manifold shown in FIG. 9.

FIG. 11 is a back view of the instrument valve manifold shown in FIG. 9 taken from the instrument face end of the manifold.

FIG. 12 is a left side view of the instrument valve manifold shown in FIG. 9.

DESCRIPTION OF THE PREFERRED EMBODIMENTS

Figure 1:
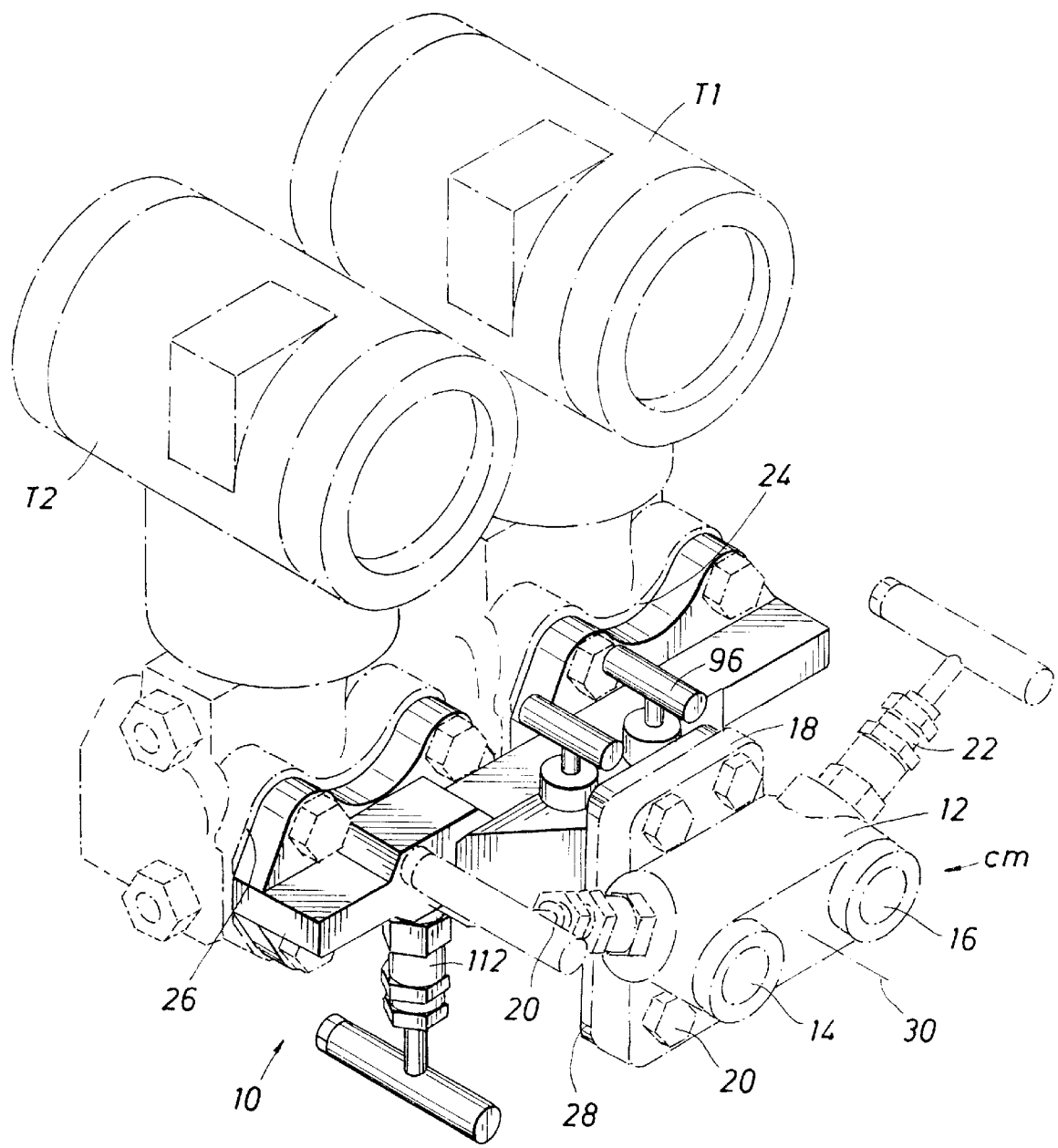
FIG. 1 is an isometric view of an instrument valve manifold in accordance with the present invention interfacing between a flowline control manifold and first and second pressure sensor units. The instrument valve manifold is shown in solid lines, and both the control manifold and the first and second pressure sensor units are shown in dashed lines.

FIG. 1 depicts in solid lines a suitable embodiment of an instrument valve manifold 10 according to the present invention for interfacing between a flowline control manifold CM and first and second pressure sensor units or transmitters T1 and T2, respectively. A suitable control manifold CM is disclosed in pending U.S. application Ser. No. 08/941,951, filed Oct. 1, 1997. The control manifold CM preferably includes a monolithic body 12 with a high pressure input port 14 and a low pressure input port 16. Those skilled in the art will appreciate that the input ports 14 and 16 are in fluid communication with the flowline being monitored and are typically spaced on the upstream side and downstream side, respectively, of a suitable restriction. As shown in FIG. 1, the control manifold CM includes a planar flange 18 for interconnecting the control manifold CM and the instrument manifold 10. For this purpose, flange 18 is provided with a plurality of peripherally spaced holes sized for receiving suitable securing bolts 20. As shown in FIG. 1, the high pressure input port 14 and the low pressure input port 16 are intended for receiving threaded fittings, each at the end of a respective flexible tube connected to the flowline being monitored. In other embodiments, ports 14 and 16 may be provided within a flange to allow the control manifold CM to be supported directly by the pipeline being monitored.

Flow through the high pressure passageway and the low pressure passageway passing through the control manifold CM is regulated by a high pressure control valve 20 and a low pressure control valve 22, each supported on the body 12. Each of these control valves 20 and 22 may thus be selectively closed and opened to block off or transmit flowline signals through the control manifold CM and then through the instrument manifold 10 and to the transmitters T1 and T2. A significant feature of the control manifold CM is that this manifold may be fluidly connected to a pipeline to be monitored, and the control valves 20 and 22 closed so that subsequent pipeline operations are not interrupted. At a later date, the instrument manifold 10 and the transmitters T1 and T2 as shown in FIG. 1 may be interconnected to the control manifold CM and the control valves 20 and 22 thereafter opened so that both the fluid flow and the pressure through the pipeline may be monitored without interrupting pipeline flow.

The pressure transmitters T1 and T2 are depicted in FIG. 1 in their preferred mounting position, i.e., with the transmitters being side by side with the face 24 for the transmitter T1 and the face 26 for the transmitter T2 each being substantially vertical and within the same plane. The faces 24 and 26 are thus parallel to the face 28 of the flange 18. A particular feature of the invention is that the instrument valve manifold 10 includes the equalizer valves and block valves discussed subsequently for selectively controlling flow signals to the transmitters T1 and T2, and that the spacing between the parallel faces 28 and both 24 and 26 is significantly reduced compared to prior art arrangements, thereby contributing to the compactness, reduced weight, and high reliability of the transmitted signals. Also, FIG. 1 illustrates that the instrument valve manifold 10 is designed such that the weight of the combined transmitters T1 and T2, as well as the weight of the instrument valve manifold 10, is equally distributed on opposing sides of a vertical central plane 30 (see FIG. 1), which is the plane of symmetry for the control manifold CM. The vertical plane of symmetry for the control manifold CM is thus also the plane of symmetry for the instrument valve manifold 10 and the one or more pressure transducers. The present invention thus both reduces the size and the weight of components connected to the control manifold, positions these components in close proximity to the control manifold to reduce the moment arm of the weight, and preferably distributes the weight substantially equally about the plane of symmetry 30 of the control manifold CM. This reduces the forces acting on the fittings, which transmit signals from the flowline being monitored and are connected to the input ports 14, 16 in the control manifold CM.

Figure 2:
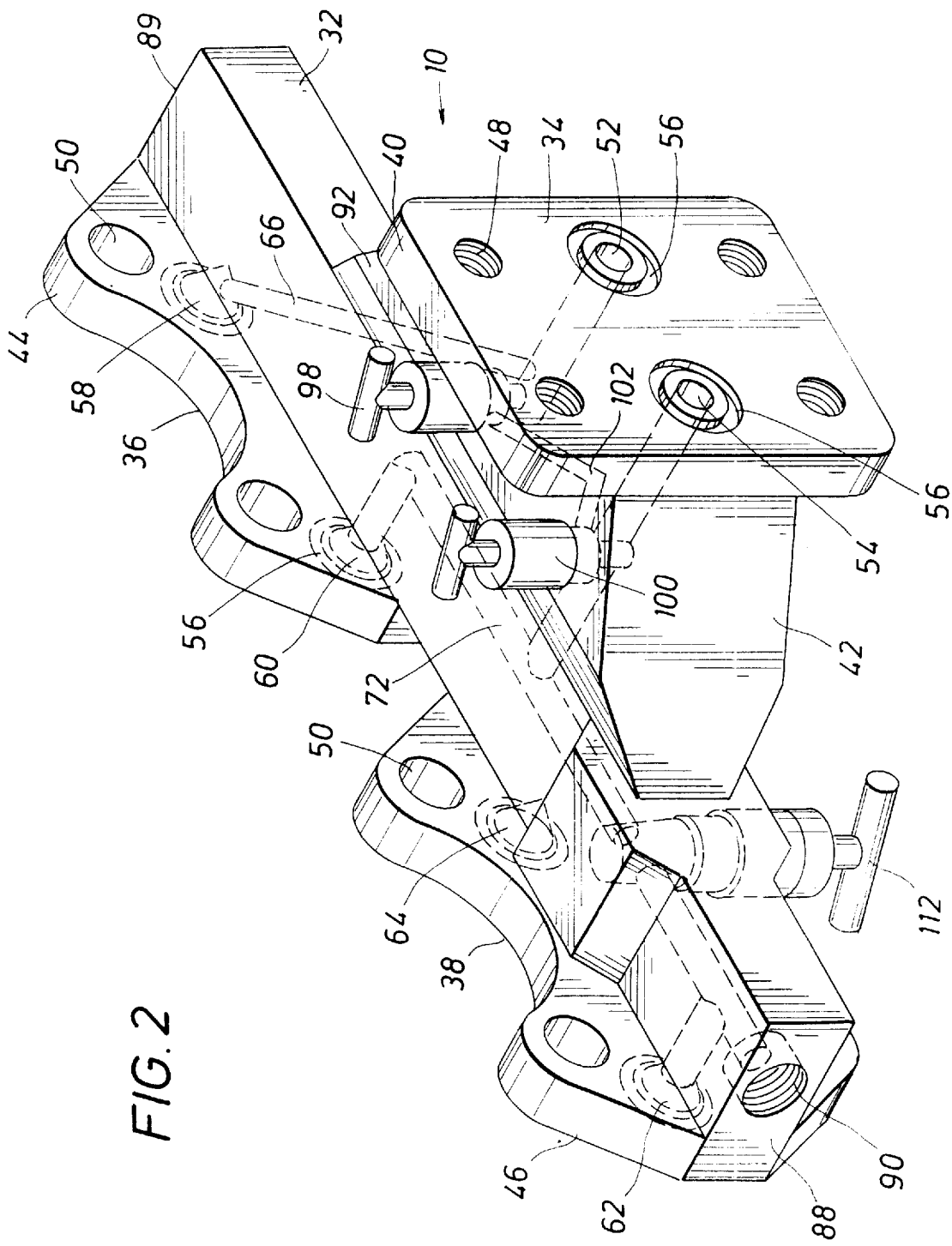
FIG. 2 is an isometric view of the instrument valve manifold shown in FIG. 1 and depicts both valves and passageways through the instrument valve manifold body.

With reference to FIG. 2, the instrument valve manifold 10 comprises a monolithic body 32 having a mating face 34 for sealing engagement with the face 28 of the control manifold CM, and a pair of instrument faces 36 and 38 each for mating engagement with a respective face 24 and 26 of the transmitters T1 and T2 shown in FIG. 1. More particularly, the instrument valve manifold body 32 comprises a first flange 40 formating engagement with the control manifold CM, a relatively thin intermediate body 42, and flanges 44 and 46 for mating engagement with the transmitters T1 and T2. A flange 40 has a plurality of peripherally spaced bolt holes 48, each for receiving a corresponding bolt 20 to interconnect the control manifold CM and the instrument valve manifold 10. The flanges 44 and 46 are each similarly provided with two upper bolt holes and two lower bolt holes 50. Four bolts (not shown) may thus be passed through the holes 50 in each of the flanges 44 and 46 for securing each transmitter to the instrument valve manifold 10.

The instrument valve manifold face 34 includes a low pressure input port 52 and a high pressure input port 54. Each of the ports 52 and 54 are preferably spaced midway between respective upper and lower bolt holes 48 in the flange 40. A ring-shaped groove 56 surrounds each input port and is sized for receiving an O-ring or other suitable sealing member to effect a reliable seal between each input port and a corresponding port in the control manifold CM. The instrument face 36 includes a low pressure plenum 58 and a high pressure plenum 60, while the instrument face 38 includes another high pressure plenum 62 and a vent plenum 64. Each of the plenums 58, 60, 62, and 64 in the instrument faces may also be surrounded by an annular groove 56 for receiving a suitable sealing member.

With reference to FIGS. 2, 3, and 7, the low pressure input port 52 and the low pressure plenum 58 are fluidly connected by a low pressure fluid passageway 66. In a preferred embodiment, the passageway 66 comprises a first portion 68 that has a central axis perpendicular to the face 34, and a second portion 70 that is inclined relative to the face 34 and interconnects the first portion 68 with the plenum 58. The high pressure fluid passageway 72 interconnects the port 54 with the high pressure plenum 60, and in a preferred embodiment includes a first portion 74, a second portion 76, and a third portion 78. The first portion 74 has a central axis perpendicular to the face 34. The second portion 76 has a central axis parallel with the face 34 and perpendicular to the axis of the first portion 74. A third portion 78 has a central axis that is perpendicular to both the axis of the second portion 76 and the face 36. A gauge pressure passageway 82 is fluidly connected to the high pressure fluid passageway 72 and includes a first portion 84 and a second portion 86. The first portion 82 has an axis aligned with the axis of the portion 76 and is thus parallel to the face 34 and perpendicular to the axis of portion 74. The second portion 86 has an axis perpendicular to the face 38 and also perpendicular to the axis of the first portion 82. Passageways 84 and 76 may be formed by drilling a single hole through the side face 88 of the body 32. A portion of this drilled hole adjacent the side face 88 may be enlarged in diameter and provided with threads 90 for receiving a suitable plug, vent valve, or test fitting. Each of the flow passageway portions described above is preferably a straight cylindrical passageway and may be formed by a conventional drilling operation.

The intermediate body portion 42 is provided with an equalizing valve pocket surface 92 spaced between the mating face 34 and the instrument faces 36 and 38. More particularly, the surface 92 is closely adjacent the flange 40 and preferably is perpendicular to the face 34. The equalizing valve pocket surface 92 in a preferred embodiment is the top surface of the body 32, i.e., the surface facing the upper portion of the instrument manifolds T1 and T2. As shown in FIG. 3, a low pressure equalizing valve pocket 94 and a high pressure equalizing valve 96 are formed in the surface 92, with each pocket 94 and 96 being in fluid communication with the low pressure passageway 66 and the high pressure fluid passageway 72, respectively. The instrument manifold includes at least one equalizing valve, and a preferred embodiment includes both a low pressure equalizing valve 98 and a high pressure equalizing valve 100 fitted within their respective equalizing valve pocket. Each equalizing valve controls the flow along an equalizing fluid passageway 102 that interconnects valve pockets 94 and 96. The valves 98 and 100 are normally closed but may be opened to equalize pressure in the plenums 58 and 60. Only one closed equalizing valve is required to maintain the high pressure fluid passageway isolated from the low pressure fluid passageway, although preferably two equalizing valves 98 and 100 are provided for the high reliability desired by the natural gas industry. In a preferred embodiment, the equalizing fluid passageway 102 as shown in FIG. 8 is substantially a V-shaped passageway formed by a first inclined portion 104 drilled from the pocket 94 and a second inclined passageway 106 drilled from the pocket 96 to intersect the first portion 104.

As shown in FIGS. 3, 6, and 7, a block valve pocket 108 is formed in the lower face 110 of the body 32 and intersects the gauge pressure passageway 82 between the high pressure passageway 72 and the high pressure plenum 62. Block valve 112 as shown in FIG. 2 is fitted within the block valve pocket 108 and controls fluid flow along the gauge pressure passageway 82. In a preferred embodiment, the intermediate portion 42 of the body 32 is relatively thin. In the area where the equalizer valves 98 and 100 are provided in the top surface 92, the body is sufficiently thick to accommodate the pockets 94 and 96 and the equalizing fluid passageway 102. In the portion of the intermediate body 42 that accommodates the block valve pocket 108, the thickness of the body is significantly reduced, as shown in FIG. 6. To accommodate the pocket 108, the body is provided with a relatively small upper upset 114 and a corresponding lower upset 116 to increase the thickness of the body to reliably support the block valve 112 and provide support in the area adjacent the pocket 108. It should be understood that the term "upset" as used herein is mean to have a geometric definition and not a process definition. The entire monolithic body 32, including the upsets 114 and 116, is preferably a single casting into which the passageways as described herein are subsequently drilled or otherwise formed. Less desirably, the body 32 may be formed by welding flanges to a cast, machined, or forged intermediate body portion.

With reference to FIGS. 2, 3, and 5, the intermediate portion 42 of the body 32 includes a first portion 118 connected to the flange 40, a second portion 120 connected to the flanges 44 and 46, and a third portion 119 that interconnects the portions 118 and 120. The first portion 118 has a reduced width, which generally coincides with the width of the flange 40, and has a uniform thickness sufficient to form a reliable interconnection with the flange 40 and to accommodate the pockets for the equalization valves. The second portion 120 is relatively thin and has a width extending from side surface 88 to side surface 89, which corresponds to the opposing external sides of the flanges 44 and 46. As indicated above, the thickness of the second portion 120 is generally uniform along its width but may be increased in the area of the control valve pocket 108 by the upsets 114 and 116. Both the first portion 118 and the third portion 119 include tapered side faces 122 and 124 angled outward from the flange 40 with increasing width toward the second portion 120. Moreover, as the width of the third portion 119 increases, its thickness is reduced. This thickness reduction achieved by the tapered top and bottom surfaces 121 and 123 of the third portion 119 and the simultaneous increasing width feature of the third portion 119 contributes to the reduced weight and high structural integrity of the instrument valve manifold.

A feature of the instrument valve manifold 10 is that the low pressure passageway 66, the high pressure passageway 72, and the gauge passageway 82 are all positioned within a single plane, as shown in FIG. 3. The entire length of these passageways may thus be bisected by a single plane. During normal mounting of the assembly as shown in FIG. 1, the plane in which these passageways are positioned is thus a substantial horizontal plane. Preferably only the equalizing passageway 102 passes out of this plane, the passageway 102 is both relatively short and is provided closely adjacent the flange 40 so that it is within a thicker portion of the intermediate body 42.

It is a feature of the invention that the instrument valve manifold 10 is adapted for cooperation with a control valve CM that has output ports such that the spacing between the centers of these ports is 1.30 inches. Accordingly, the spacing between the ports 52 and 54 as shown in FIGS. 3 and 7 may also be at 1.30 inches, so that the input ports to the instrument valve manifold 10 are aligned with the output port from the control manifold CM. Transmitters manufactured by various manufacturers are frequently intended to accommodate low pressure and high pressure lines at a centerline spacing of 2.125 inches. Accordingly, the spacing between the centerlines of the plenums 58 and 60 may have the standard 2.125-inch spacing for accommodating commercially available transmitters. Similarly, the centerline spacing between the high pressure plenum 62 and the vent plenum 64 may also be at this 2.125-inch spacing.

An annular groove is shown in FIG. 7 around the vent plenum 64, although this plenum 64 is merely provided for venting pressure from the transmitter T2 during its operation. Accordingly, an annular groove 56 need not be provided about the vent plenum 64, or an annular groove may be provided, but no seal provided in this groove. Also, a small bleed groove 65 may be provided along the instrument face 38 from the vent plenum 64 to a side of the flange 46 to ensure that the plenum 64 is continually vented to atmosphere.

Figure 9:
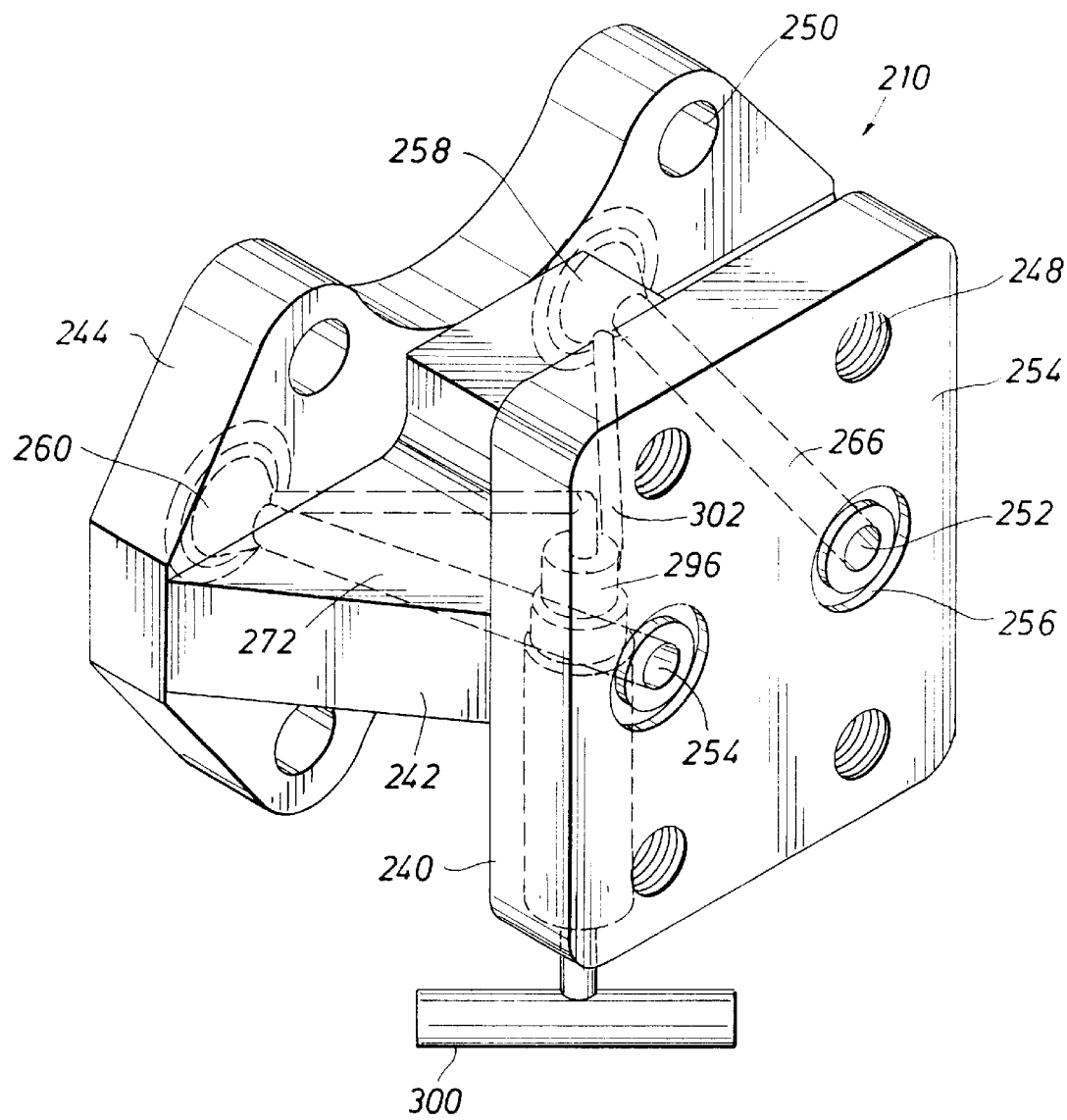
FIG. 9 is an isometric view of an alternate embodiment of an instrument valve manifold in accordance with the present invention, showing the flow paths through the instrument valve manifold body and a single equalization valve.

FIG. 9 depicts another embodiment of an instrument valve manifold 210 that is similarly intended for cooperation with the control valve manifold CM discussed above. Instrument valve manifold 210 is designed for interfacing with a single pressure sensor unit or transmitter, but otherwise has many of the features of the instrument valve manifold previously described. Accordingly, when a component in this embodiment is similar to a component in the previously described embodiment, a reference number greater by 200 than the previously described component is used, and accordingly the similar component is not always discussed in detail below.

Figure 14:
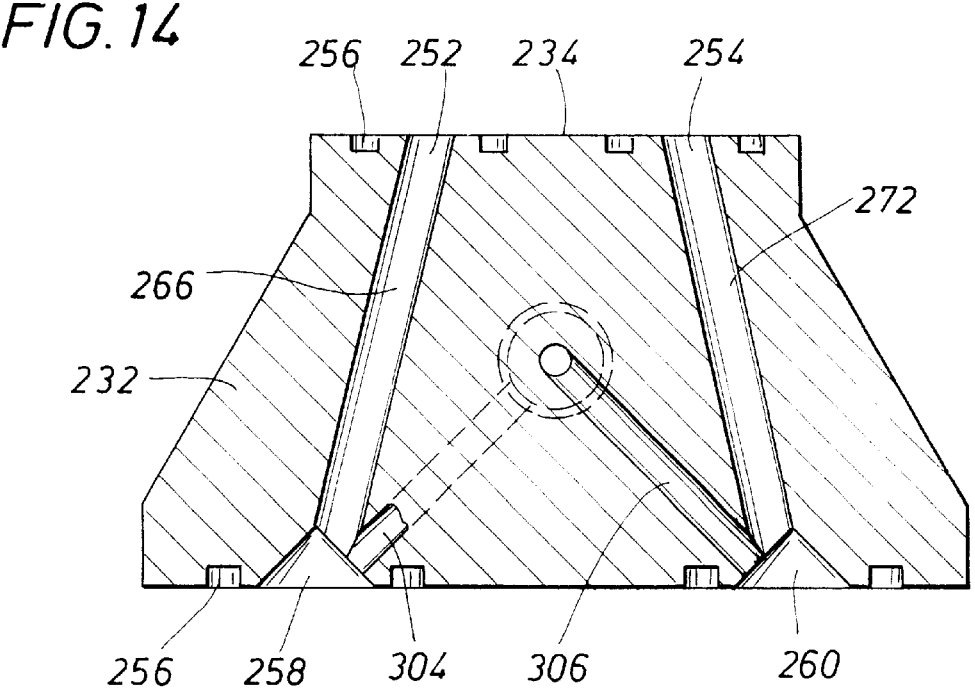
FIG. 14 is a cross-sectional view taken along lines 14—14 in FIG. 11.

The instrument valve manifold 210 includes a flange 240 (similar to the flange 40 discussed above), an intermediate body 242, and an instrument flange 244. The flanges 240 and 244 and the intermediate body 246 thus comprise the monolithic body 232, as shown in FIG. 14. For the embodiment shown in FIG. 9, the instrument valve manifold 210 contains a single equalizer valve 300, which is fitted within the pocket 296. The pocket 296 is provided in the lower surface 310 of the intermediate body 242, as shown in FIG. 12. In an alternate embodiment, the equalizer valve pocket could instead be provided in the upper surface 292 of the intermediate body 242.

The instrument valve manifold body 210 includes a low pressure passageway 266 that fluidly interconnects the low pressure input port 252 to the low pressure plenum 258, and a high pressure passageway 272 that interconnects the high pressure input port 254 to the high pressure plenum 260. Both the low pressure passageway 266 and the high pressure passageway 272 are positioned within a single plane, which during normal mounting of the instrument valve manifold 210, is a substantially horizontal plane. Each of the passageways 266 and 272 is angled with respect to the face 234 of the flange 240 so that the input port and corresponding plenum are fluidly connected by a single straight passageway. The passageways are angled since the spacing between the ports 252 and 254 in the preferred embodiment is 1.30 inches, while the spacing between the centerlines of the plenums 258 and 260 is 2.125 inches. In a less preferred embodiment, this increased spacing between the input port and the plenums could be obtained by angling only one passageway, but then the instrument valve manifold 208 and the transmitter connected thereto would not be maintained within the vertical plane of symmetry of the control manifold CM.

The instrument valve manifold 210 as shown in FIG. 9 does not include a block valve since no gauge passageway to another transmitter is provided. In the embodiment shown, a single equalizer valve 300 is provided within the equalizer pocket 296 formed in the lower surface 310 of the intermediate body 242. As shown in FIGS. 9, 10, and 14, the substantially V-shaped passageway 302 passes through the pocket 296, with angled passageway 304 being in fluid communication with the plenum 258 and the angled passageway 306 being in fluid communication with the plenum 260. By opening the equalizing valve 300, the pressure in the plenums 258 and 260 may be equalized. Each of passageways 304 and 306 may be drilled from the respective plenum to intersect the pocket 296.

Figure 13:
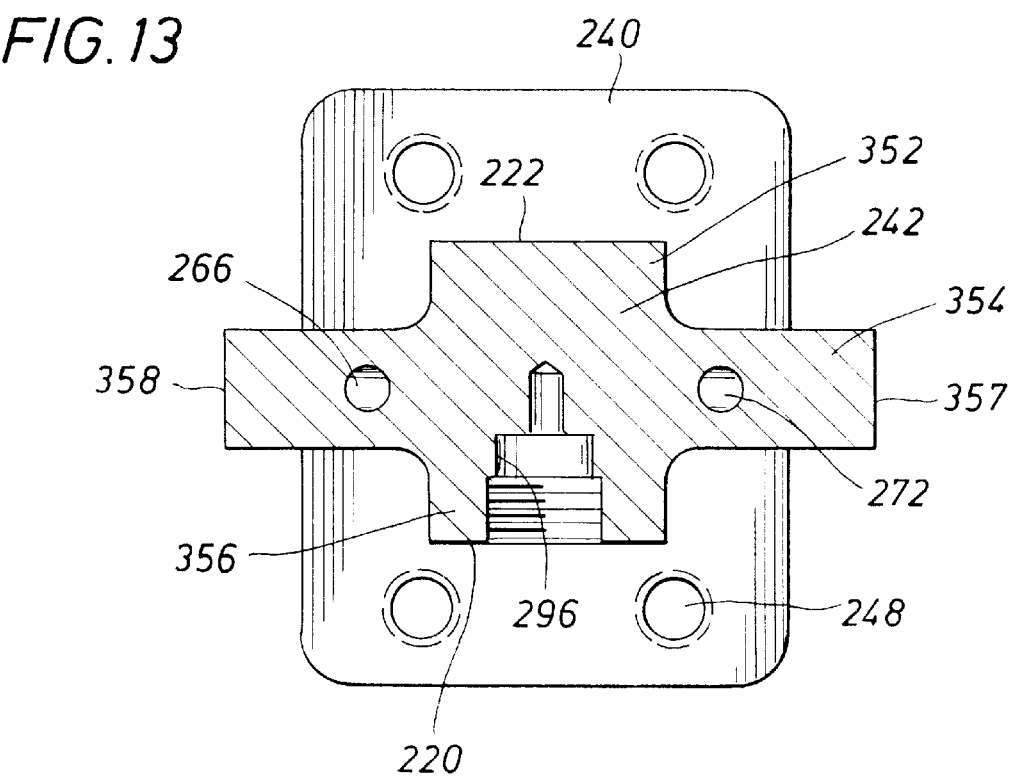
FIG. 13 is a cross-sectional view taken along lines 13—13 in FIG. 10.

As shown in FIGS. 9, 12, and 13, the intermediate body portion 242 between the flange 240 and the flange 244 has a generally rectilinear top upset portion 352 having a width narrower than the width of the flange 240, an intermediate portion 354, and a bottom portion 356 having a geometry similar to the top portion 252. The portions 352 and 356 extend between the flanges 240 and 244 to increase the structural integrity between the flanges. At the interface with the flange 240, the intermediate portion 354 has a reduced width that generally coincides of the flange 240. This intermediate portion 354 includes tapered side faces 357 and 358 angled outwardly from the flange 240 with increasing width toward the flange 244. This increasing width feature of the intermediate portion 354 contributes to the reduced weight and high structural integrity of the instrument valve manifold 210. The pocket 296 is preferably formed along the symmetrical plane of the instrument valve manifold 210, and the lower rectilinear portion 356 provides sufficient thickness to accommodate both the pocket 296 and the equalizer valve 300.

During operation of the instrument valve manifold 10, it will be appreciated that with control valves 20 and 22 in the control manifold CM open and both equalizing valves 94 and 96 and block valve 112 closed, high pressure fluid will enter plenum 60 via passageway 72 while low pressure fluid will enter plenum 58 via low pressure passageway 66. This will permit measurement of the differential pressure by the pressure sensor unit or transmitter T1. If it is desired to equalize pressure in plenums 58 and 60, both equalizing valves 94 and 96 are open. If only one of equalizing valves 94 or 96 is closed, equalization is not obtained.

The static pressure in the main flowline may be measured using a pressure sensor unit or transmitter T2. The block valve 112 would be open so that high pressure fluid would be in communication with plenum 62 and hence the pressure transducer or pressure sensor unit T2. Pressure sensor unit T2 may be vented via plenum 64, as previously described.

During operation of the instrument valve manifold 210, controls valves 20 and 22 in the control manifold CM are open, and the equalization valve 300 in the manifold 210 is closed. High pressure fluid will thus enter the plenum 260 via passageway 272, while low pressure fluid will enter at the plenum 258 via passageway 266. If equalization between the plenums 258 and 260 is desired, e.g., to test or "zero out" the transmitter, the equalization valve 300 may be opened.

It should be understood that the instrument flanges 44 and 46 in the instrument valve manifold 10 and the flange 244 in the instrument valve manifold 210 may have various configurations suitable for mating engagement with the faces of a sensor unit or transmitter. The configuration of the instrument flanges for the instrument valve manifolds discussed herein is thus merely exemplary.

It should also be understood that plenums are preferably provided in each of the instrument valve manifold flanges, as shown in the figures and as discussed above. These plenums each have a diameter within the transmitter face of the flange that is greater than the diameter of the passageway supplying the signals to the respective plenum, thereby ensuring that reliable fluid communication is obtained between the passageway and the corresponding input port in the transmitter. As shown in FIG. 9, the plenums 258 and 260 may also serve to fluidly interconnect the passageways through the instrument valve manifold body with the equalizing valve passageway. The plenums as discussed herein generally have a conical configuration, although other configurations could be used. Also, it should be understood that the term "plenum" as used herein is intended broadly to mean the chamber in the transmitter flange of the instrument valve manifold for fluid communication with the respective transmitter and may merely be the output port of a respective fluid passageway that provides fluid communication to the input port of a transmitter.

Various types of valves and vent nipples may be used in the manifold of the present invention, all of which are of conventional construction and need not be described in detail. For example, valves such as ball valves, plug valves, and globe valves may be used as the various valves. Additionally, the valves employed may be of the soft seat or seated metal type, depending upon the environment to which the manifold of the present invention is subjected. Conventional vent nipples may be provided in the instrument valve manifold, and alternatively may be provided in the lower portion of a transmitter.

The foregoing description and examples illustrate selected embodiments of the present invention. In light thereof, variations and modifications will be suggested to one skilled in the art, all of which are in the spirit and purview of this invention.

What is claimed is:

1. An instrument valve manifold for interfacing between a flowline control manifold and first and second pressure sensor units, said flowline control manifold including a high pressure line and a low pressure line controlled by a respective high pressure control valve and low pressure control valve, the instrument valve manifold comprising:

a monolithic body, said body defining a mating surface for mating with said flowline control manifold, said mating face including a low pressure input port in fluid communication with said low pressure line and a high pressure input port in fluid communication with said high pressure line, a low pressure plenum and a high pressure plenum formed in an instrument face for cooperation with said first pressure sensor unit, a second high pressure plenum formed in said instrument face for cooperation with said second pressure sensor unit, said body further including an equalizing valve pocket surface spaced between said mating face and said instrument face;

a low pressure fluid passageway in said body extending from said low pressure input port in said mating surface to said low pressure plenum;

a high pressure fluid passageway in said body extending from said high pressure input port in said mating surface to said high pressure plenum;

a low pressure equalizing valve pocket and a high pressure equalizing valve pocket each formed in said equalizing valve pocket surface and in fluid communication with the low pressure fluid passageway and high pressure fluid passageway, respectively;

an equalizing fluid passageway interconnecting said high pressure equalizing valve pocket and said low pressure equalizing valve pocket;

an equalizing valve fitted to one of said low pressure equalizing valve pocket and high pressure equalizing valve pocket for controlling fluid flow along said the equalizing fluid passageway;

a gauge pressure passageway in said body connected to said high pressure fluid passageway, said gauge pressure passageway being in fluid communication with said second high pressure plenum;

a block valve pocket intersecting said gauge pressure passageway between said high pressure fluid passageway and second high pressure plenum; and a block valve fitted to said block valve pocket for controlling flow along said gauge pressure passageway.

2. The instrument valve manifold as defined in claim 1, wherein said high pressure passageway has a first passageway portion having a first axis perpendicular to said mating face, a second passage way portion having a second axis perpendicular to said first axis and parallel to said mating face, and a third passageway portion having a third axis parallel to said first axis and perpendicular to said instrument face.

3. The instrument valve manifold as defined in claim 2, wherein said gauge pressure passageway has an intermediate portion having an intermediate axis coaxial with said second axis and a pressure sensor portion parallel with said first axis and perpendicular to said instrument face.

4. The instrument valve manifold as defined in claim 3, wherein said intermediate passageway is in fluid communication with a threaded port in a side of said monolithic body.

5. The instrument valve manifold as defined in claim 1, wherein said high pressure fluid passageway, said low pressure fluid passageway, and said gauge pressure passageway are each formed within a single plane spaced substantially midway between an upper surface and a lower surface of said monolithic body.

6. The instrument valve manifold as defined in claim 1, wherein each of said equalizing valve and said block valve are spaced within one of an upper surface and a lower surface of said monolithic body.

7. The instrument valve manifold as defined in claim 1, further comprising:

another equaling valve fitted in another of said low pressure equalizing valve pocket and said high pressure equalizing valve pocket for controlling flow along said equalizing flow passageway.

8. The instrument valve manifold as defined in claim 1, wherein said equalizing valve passageway has a substantially V-shaped configuration.

9. The instrument valve manifold as defined in claim 1, wherein the monolithic body includes a right side face and a left side face each tapered to decrease a width of said monolithic body from said mating face and toward said instrument face.

10. The instrument valve manifold as defined in claim 1, wherein said monolithic body includes an upper surface and a lower surface each tapered to increase a thickness of said monolithic body from said mating face and toward said instrument face.

11. The instrument valve manifold as defined in claim 1, wherein a sensor unit spacing between a center of said first high pressure plenum and a center of said low pressure plenum is greater than an input port spacing between said high pressure input port and said low pressure input port.

12. The instrument valve manifold as defined in claim 11, wherein said sensor unit spacing is substantially 2.125 inches and said input port spacing is substantially 1.30 inches.

13. An instrument valve manifold for interfacing between a flowline control manifold and pressure sensor unit, said flowline control manifold including a high pressure line and a low pressure line controlled by a respective high pressure control valve and low pressure control valve, the instrument valve manifold comprising:

a monolithic body, said body defining a mating surface for mating with said flowline control manifold, said mating face including a low pressure input port in fluid communication with said low pressure line and a high pressure input port in fluid communication with said high pressure line, a low pressure plenum and a high pressure plenum formed in an instrument face for cooperation with said pressure sensor unit, said body further including an equalizing valve pocket surface between said mating face and said instrument face;

a low pressure fluid passageway in said body extending from said low pressure input port in said mating surface to said low pressure plenum;

a high pressure fluid passageway in said body extending from said high pressure input port in said mating surface to said high pressure plenum;

an equalizing valve pocket formed in said equalizing valve pocket surface;

an equalizing fluid passageway in said body interconnecting said low pressure fluid passageway and high pressure fluid passageway, said equalizing fluid passageway passing through said equalizing valve pocket; and an equalizing valve fitted to said equalizing valve pocket for controlling fluid flow along said the equalizing fluid passageway.

14. The instrument valve manifold as defined in claim 13, wherein each of the low pressure fluid passageway and high pressure fluid passageway are angled with respect to said mating face.

15. The instrument valve manifold as defined in claim 13, wherein said low pressure fluid passageway and high pressure fluid passageway are each formed within a plane spaced substantially midway between an upper surface and a lower surface of said monolithic body.

16. The instrument valve manifold as defined in claim 13, wherein said equalizing valve is spaced within one of an upper surface and a lower surface of said monolithic body.

17. The instrument valve manifold as defined in claim 13, wherein said equalizing valve passageway has a substantially V-shaped configuration.

18. The instrument valve manifold as defined in claim 13, wherein said monolithic body includes a right side face and a left side face each tapered to increase a width of said monolithic body from said mating face and toward said instrument face.

19. The instrument valve manifold as defined in claim 13, wherein a sensor unit spacing between a center of said high pressure plenum and a center of said low pressure plenum is greater than an input port spacing between said high pressure input port and said low pressure input port.

20. The instrument valve manifold as defined in claim 19, wherein said sensor unit spacing is substantially 2.125 inches and said input port surface spacing is substantially 1.30 inches.

\* \* \* \* \*